April 24, 1973  A. H. McELROY  3,729,360
PORTABLE THERMOPLASTIC PIPE FUSION APPARATUS
Filed March 8, 1971  4 Sheets-Sheet 1

INVENTOR.
ARTHUR H. McELROY
BY Head & Johnson
ATTORNEYS

United States Patent Office 3,729,360
Patented Apr. 24, 1973

3,729,360
PORTABLE THERMOPLASTIC PIPE
FUSION APPARATUS
Arthur H. McElroy, 2789 E. 45th Place,
Tulsa, Okla. 74105
Filed Mar. 8, 1971, Ser. No. 121,791
Int. Cl. B32b 31/12, 31/18, 31/20
U.S. Cl. 156—499     11 Claims

ABSTRACT OF THE DISCLOSURE

A portable wheeled apparatus for use in fusing thermoplastic (i.e., polyethylene) pipe includes means for hydraulically actuating the pipe for facing the pipe ends, heating the pipe ends and fusing them together all in axial alignment of the pipe.

BACKGROUND

The use of thermoplastic pipe for pipelines is becoming more commonplace as a replacement to the more corrosive or metallic pipe. Mechanical or manually operated devices and methods for fusing the pipe are shown in U.S. Pats. 3,013,925 and 3,552,265. This invention is an improvement upon the teachings therein in that it provides a unique hydraulic system which may be actuated by an operator in the facing, heating and ultimate fusion of the pipe wherein the hydraulic forces are applied on each side of the pipe in a plane passing through the center line of the pipe and hence permit equal pressures to be applied during the facing, heating and fusion processing.

SUMMARY

Accordingly this invention provides a device which may be drawn or pulled over the ground in conjunction with the laying of a thermoplastic pipeline which is easy to use and adapt to various pipe sizes; is capable of high ground clearance; and capable of joining a section of pipe every six minutes as compared to forty-five minutes with prior art procedures. More importantly, the invention provides means to assure axial alignment of the pipe not only for the pipe-end facing and preheating but also during the fusion process. Hydraulic actuating cylinder means to move one end of pipe towards another axially are positioned on each side of the pipe such that the axes of the cylinders lay in an imaginary plane which intersects the axis of the pipe.

DESCRIPTION OF THE PREFERRED EMBODIMENTS

Figure 1:
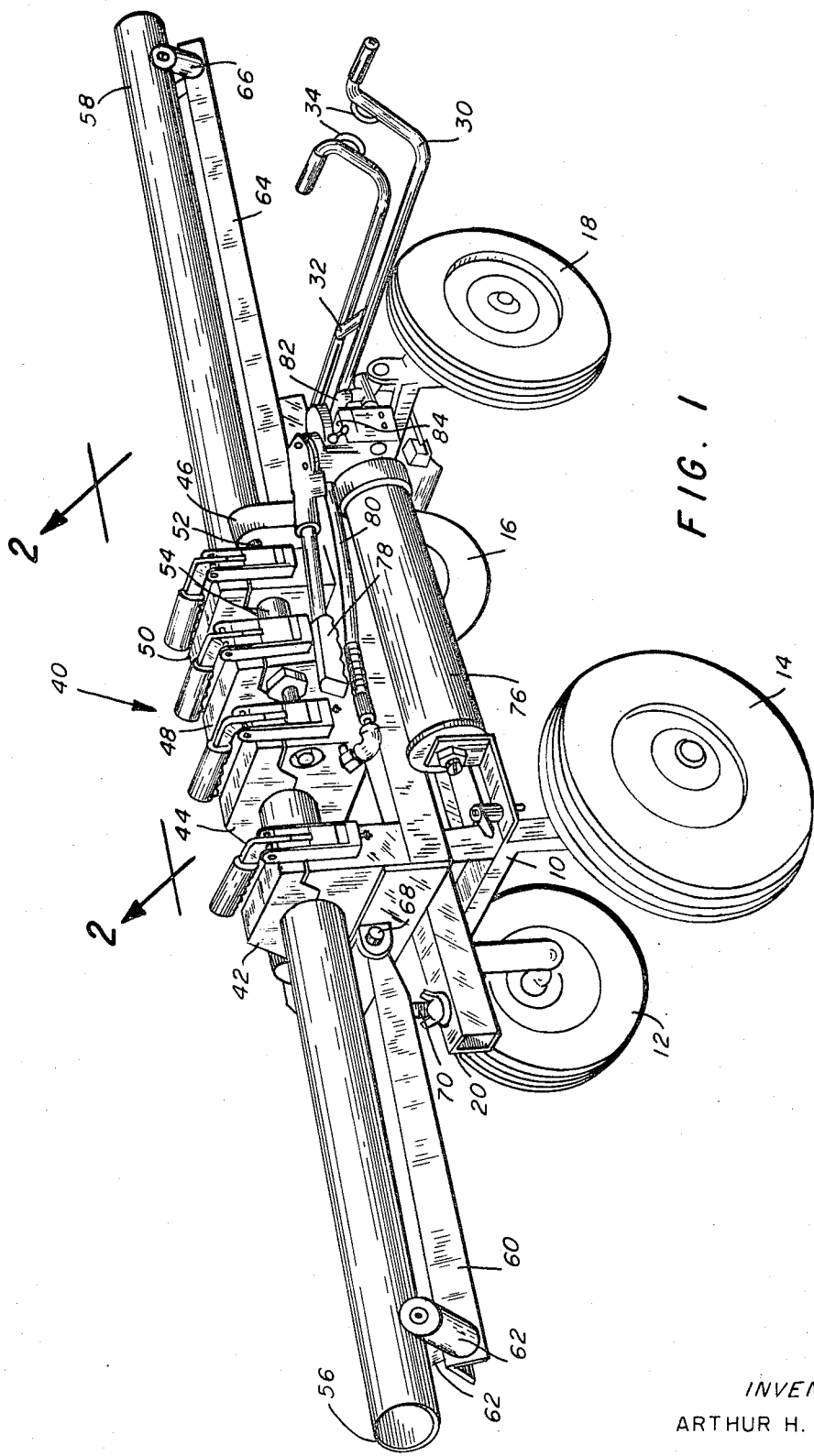
FIG. 1 is an overall perspective view of the apparatus of this invention.
Figure 2:
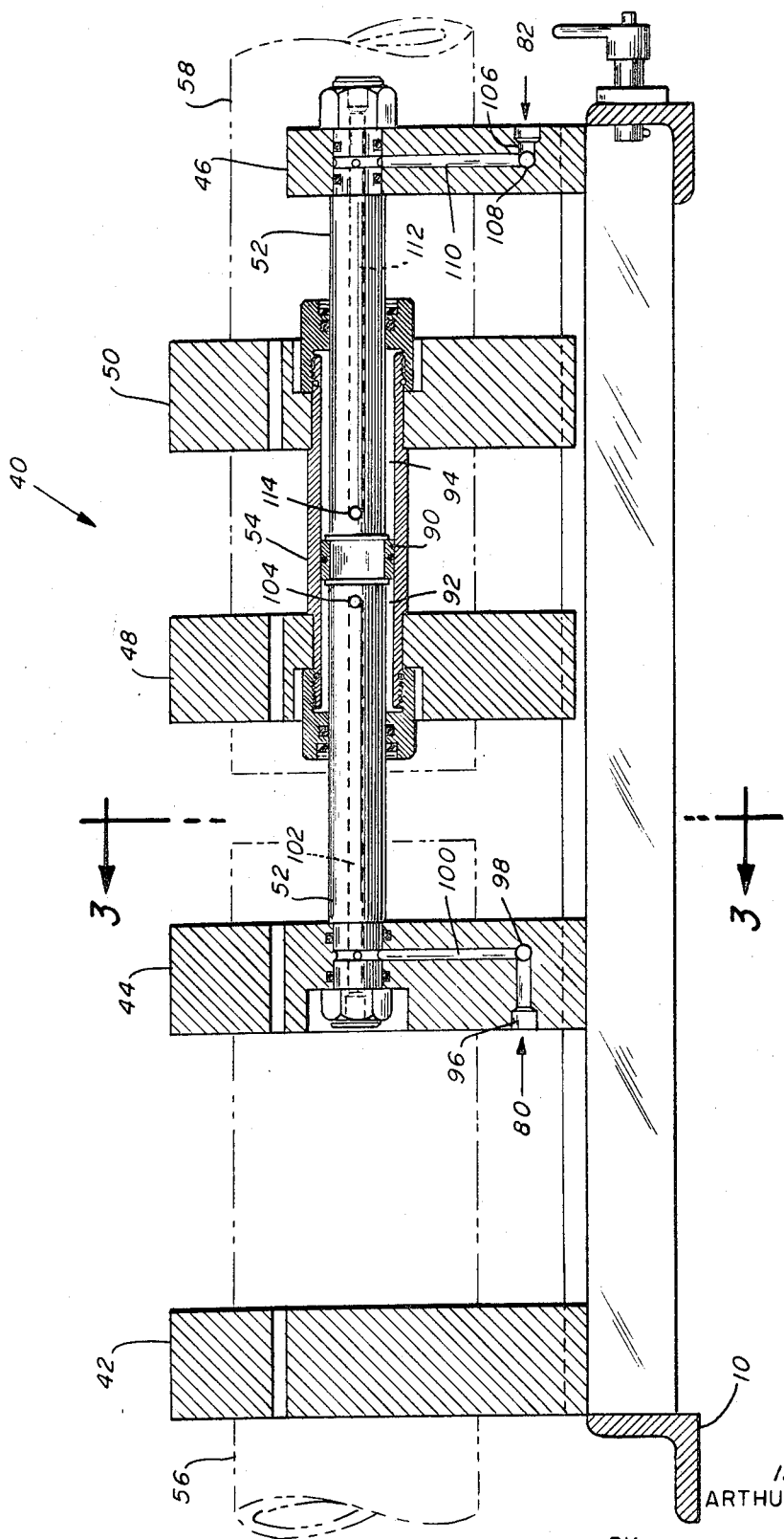
FIG. 2 is a partial sectional view taken along the line 2—2 of FIG. 1.

Referring now to the drawings and specifically to FIG. 1, the overall apparatus of the invention is described which includes a basic structural frame 10 to which are adapted a pair of rear wheels 12 and 14 and a pair of forward wheels 16 and and 18, the forward wheels being pivotal to the frame for guiding the vehicle. A central structural frame 20 extends across the frame 10 longitudinally parallel to the longitudinal axis of the pipeline. In this instance, the axis coincides with the forward rearward axis of the vehicle. Handlebar 30 generally comprises two identical substantially parallel portions with spacing therebetween to a cross brace member 32. Ring openings 34 permit attachment to another moving vehicle if desired. Attached to the vehicle frame is the pipeline fusion assembly generally designated by the numeral 40. The assembly 40 is removable for use at a fixed location wherein the pipe is brought to the assembly as opposed to moving the assembly relative to the pipe. This further permits the assembly to be positioned within a "bellhole" of an existing buried pipeline for repair of same. The assembly can also be operated remotely. The assembly includes spaced and fixed upright clamps 42 and 44 and an end support 46. Between the end support 46 and fixed clamp 44 are movable pipe clamps 48 and 50. Each of the affixed and movable clamp members 42, 44, 48 and 50 are basically the same including over-center clamping means in which the upper portion of the clamp may be released and opened to receive the pipe 58 which is to be fused to pipe 56, representing the next adjacent section. On directly opposite sides of the pipes 56 and 58 and extending between the end support 46 and fixed clamp 44 is a guide rod 52 which includes a coaxial cylindrical portion 54 extending between and affixed to the movable clamps 48 and 50. An important aspect of this invention that is critical to the operation is that the axes of opposed guide rods 52 and 53 shall lie within an imaginary plane which includes the axis of pipes 56 and 58. A removable frame extension 60 extends rearwardly and includes pipe support rollers 62 forming a V. Similarly, forwardly is frame extension 64 including rollers 66. Each of the frame extensions are pivotal about the frame as for example at rearward pin 68. A bolt and lock nut assembly 70 extends upwardly in abutment with the support members providing adjustable support to the pipe depending upon the diameter pipe being used, etc. Suitably attached to the frame of the vehicle is a hydraulic cylinder 76 which in this particular instance is a hand operated pump using hand lever 78 to achieve hydraulic pressure through valve-controlled lines, one of which is shown at 80, the other being 82. A valve 84 permits control of the hydraulic fluid input and output to the clamp cylinder 54 as best shown in FIG. 2. In the preferred embodiment the hydraulic cylinder is a two-speed hydraulic pump capable of providing a high pressure-high speed, e.g., 2 inch per stroke movement dependmovable clamps 48 and 50 and alternatively a low pressure-high speed, e.g., 2 inch per stroke movement depending upon the desired function incident to the fusion process. Typical of such a pump is that made and sold under the trademark "Enerpac," although other means to accomplish such movement are inclusive of the invention.

Referring now to FIG. 2, the cross-sectional view showing therein describes the power cylinder 54 which connects clamp members 48 and 50 together and which is adapted for movement relative to the support 52 which remains fixed between support member 46 and fixed clamp 44. Intermediate the length of the support rod 52 is a fixed piston member 90 which sealably divides the cylinder 54 into a first annular chamber 92 and a second annular chamber 94. Hydraulic fluid enters via conduit 80 to a connection 96 within the support clamp 44. From there a fluid communication is made to chamber 92 through a transverse opening 98 which extends across the fixed clamp 44 to communicate with an identical hydraulic fluid system. The transverse conduit 98 then connects to suitable conduit 100 which communicates into longitudinal opening 102 within the center of the support rod 52 with the exit via outlet 104 into a first chamber 92. Likewise hydraulic fluid or exhaust via conduit 82 enters an opening 106 provided in support block 46 to a transverse opening 108 similar to opening 98 which further connects conduit 110 to the interior 112 of support rod 52 which exits through opening 114 into the second chamber 94.

Figure 3:
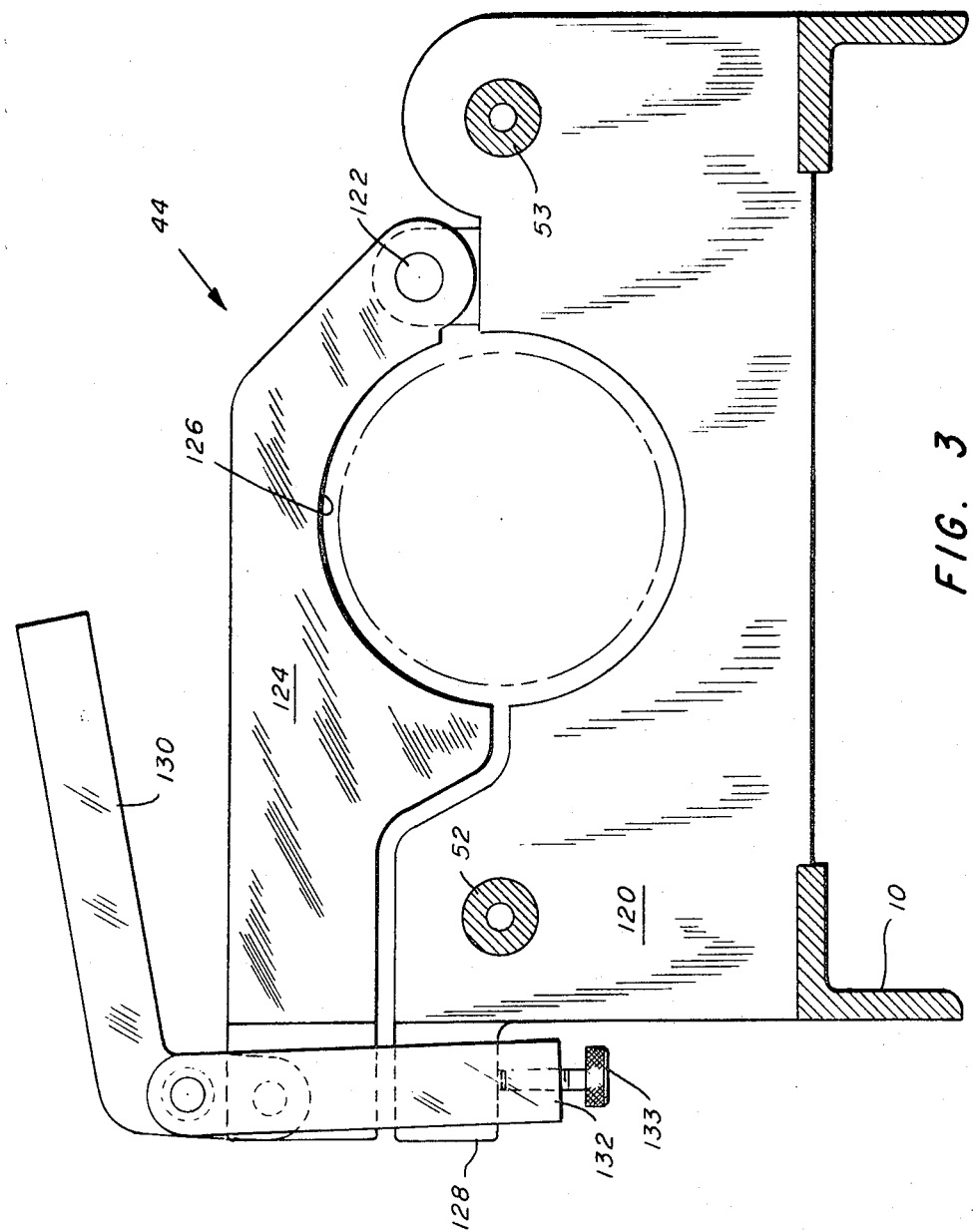
FIG. 3 is a sectional view taken along the line 3—3 of FIG. 2.

Referring now to FIG. 3, a typical support clamp, 44 in this instance, is described. Such a clamp basically includes a lower support portion 120 affixed to frame 10 to which the upper movable jaw 124 is pivotally supported about pivot pin 122. The clamp 44 supports rods 52 and 53 the axes of which, as shown, lay in an imaginary plane which includes the axis of the pipe to be joined. The pipe extends through opening 126 formed by the fixed and movable jaw portions. Of course, for different sizes of pipe suitable spacer cylinder members may be placed within the fixed and movable jaw portions to clamp the pipe. The lower fixed jaw 120 includes an outwardly extending lip 128 to which an 'overcenter' type of handle linkage mechanism 130–132 is attached. Movement of the handle 130 in a counterclockwise direction of FIG. 3 will release the lower yoke portion 132 from beneath the lip 128 allowing the upper portion 124 to be raised out of the way to receive additional lengths of pipe. Bolt 133 permits adjustment of clamping pressure.

Figure 4:
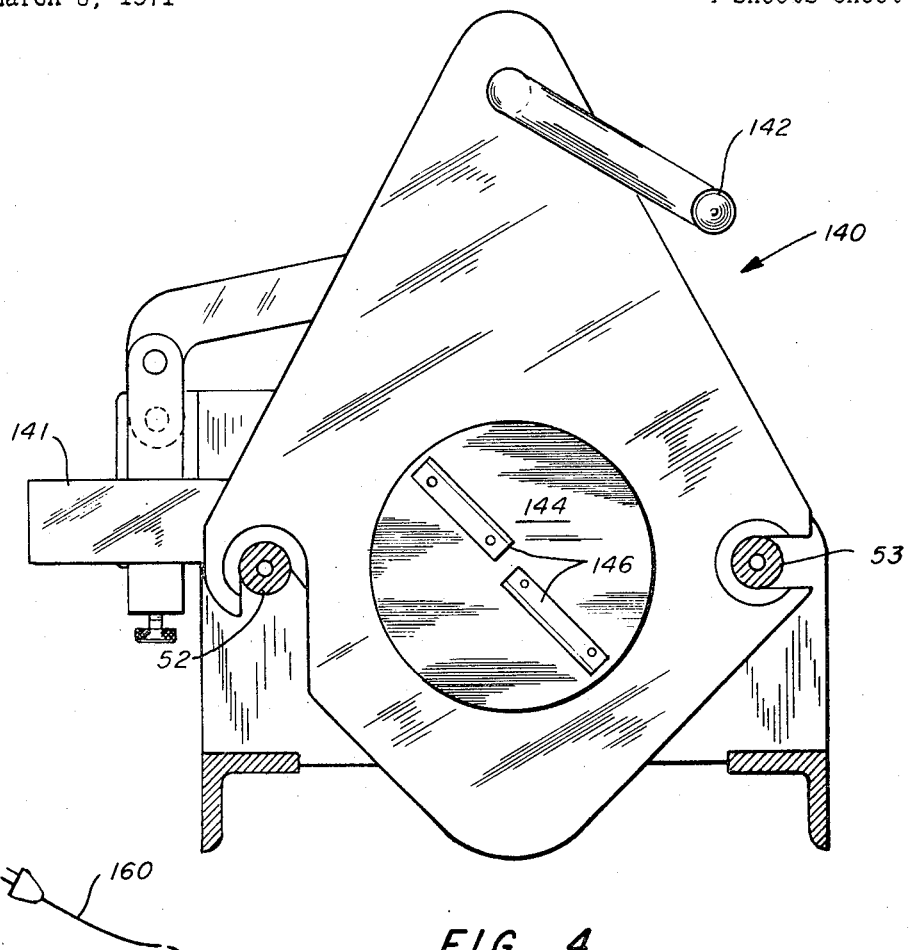
FIGS. 4 and 5 are views taken generally along the line 3—3 of FIG. 2 depicting respectively the pipe facing cutter and pipe end heater for use with this invention.
Figure 5:
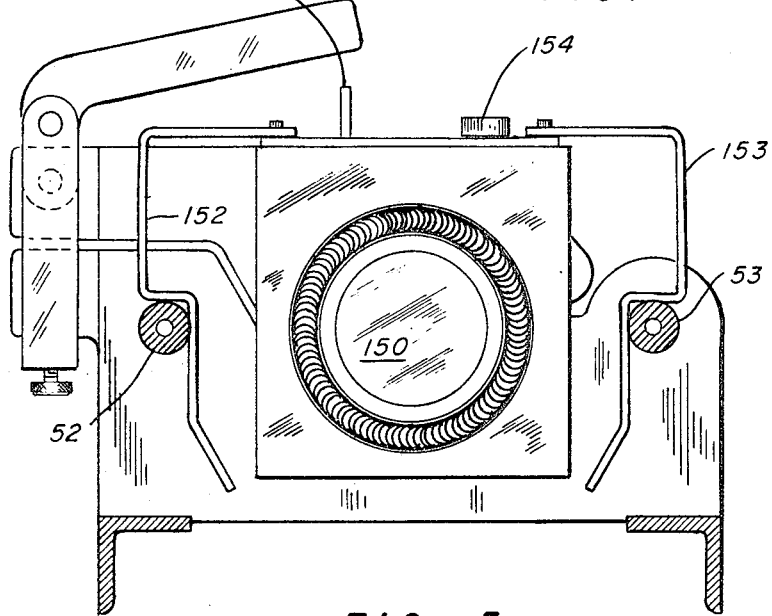

FIGS. 4 and 5 are generally taken along the line 3—3 of FIG. 2 but are depicted to show respectively the pipe end facing cutter generally designated by the numeral 140. The cutter includes a handle 141 to assist in positioning the cutter upon the guide rods 52 and 53 between the fixed clamp 44 and the movable clamp 48. An electric motor or hand crank 142 rotates, through a gear reduction housed in the device, arbor 144 which supports cutters 146 on each side for facing the pipe ends. FIG. 5 depicts a typical electrically operated fusion element 150 for softening the ends of the thermal plastic pipe prior to fusion, and which likewise is inserted between the fixed clamp 44 and the removable clamp 48 and retained upon guide rods 52 and 53 by spring clips 152 and 153.

OPERATION

Preferably the operation of the device of this invention is used in construction of pipelines using polyethylene or other types of plastic pipe in which the ends of the pipe are directly fused and sealed together without collars, couplings, etc. It is to be understood, however, that the invention of moving the pipe ends axially toward each other in the manner described herein can be used satisfactorily in other methods of joining plastic pipe, as for example using solvents, or couplings, or metallic pipe. In use, the vehicle is adapted to be placed beneath the first or trailing section of pipe 56 to a position wherein the end of that pipe is intermediate the fixed clamp 44 and the movable clamp 48. Clamps 42 and 44 are thus actuated to lock pipe 56 in place. Outward and rearward support for the pipe is provided by the member 60 and rollers 62 which may be adjusted vertically by moving the lock nut and bolt 70. The next adjacent piece of pipe 58 is placed within the open jaws of clamps 48 and 50 to a position where its end is intermediate clamps 44 and 48 toward the fixed end of pipe 56 previously positioned. Sufficient space is provided between the two pipe ends to permit positioning of the pipe and facing cutter 140. The hydraulic pump is actuated and pressure fluid is caused to flow eventually into cylinder space 92 while hydraulic fluid is exhausted from piston space 94. This forces the movable clamps 48 and 50 to move in unison carrying the end of pipe 58 toward the cutter 140 which together move into an abutting relationship with the end of pipe 56. Rotation of crank 142 rotates arbor 144 and cutters 146 to create substantially parallel edges of the pipe ends. Thereafter the hydraulic flow system is reversed, usually at the higher travel speed, permitting the movable jaws to reverse their direction by supplying pressure fluid via line 82 into the second cylinder chamber 94 while exhausting from the chamber 92. The pipe end cutter 140 is removed and inserted in its place is the dual faced heating element 150 which is adapted to be situated by spring clips 152 and 153 upon the support rods 52 and 53 as shown in FIG. 5. Suitable heat is provided as for example from electrical power conduit 160 providing a heated surface opposite each pipe end. The process of moving pipe 58 into contact therewith is repeated as previously described as with the facing cutter 140. Once the pipe ends are softened removable clamps 48 and 50 are quickly reversed hydraulically permitting removal of the heating element. Thereafter hydraulic pressure fluid forces pipe 58 towards the pipe end 56 whereby the softened ends of each pipe join and fuse together. Thereafter all of the pipe clamps 42, 44, 48 and 50 are released. Handlebar 30 is raised upward, member 32 strikes the forward support member 64 raising it upward whereby the now fused join of pipe is slightly raised above the lower clamp openings. The vehicle is moved to the end of pipe joint 58 where the process is repeated for the next pipe section.

It is to be understood that the invention above described is not limited in its application to the details of construction and arrangement of parts illustrated in the accompanying drawings since the invention is capable of other embodiments and of being practiced or carried out in various ways. Also it is to be understood that the phraseology or terminology employed herein has been for the purpose of description and not of limitation.

What is claimed:

1. Apparatus for fusing molten pipe ends together in combination:

a support frame;

fixed clamp means on said frame to retain a molten end of a first section of pipe in a fixed axial position;

movable clamp means adapted to retain a molten end of a second section of pipe axially spaced from said end of said first pipe, said movable clamp means movably supported upon guide rods, said rods fixed to said frame on each side of said pipe the axes of which lie in an imaginary plane which intersects the axis of said first and second pipe ends; and hydraulic power means associated with each guide rod to move said movable clamp means toward said fixed clamp means whereby said second molten pipe end contacts and fuses with said first molten pipe end and to retract said movable clamp away from said fixed clamp.

2. Apparatus of claim 1 wherein said movable clamp means comprises:

first and second pipe support clamps spaced axially along said second pipe and retained together by cylinders slidably coaxial about said guide rods, the ends of said cylinders being sealably closed to said guide rods;

each guide rod including a fixed piston dividing each of said cylinders into a first annular chamber and a second annular chamber; and pressure fluid flow passages to provide pressure fluid communication from a hydraulic power source to said first annular chambers while exhausting pressure fluid from said second annular chambers and vice-versa.

3. Apparatus of claim 1 including rotatable wheels attached to said frame for rolling movement along the ground.

4. Apparatus of claim 1 wherein said hydraulic power means includes control means to move or retract said movable clamp means at selective rates of travel.

5. Apparatus of claim 1 including vertically adjustable guide rollers extending from said frame for supporting the remaining unclamped portion of said first section of pipe; and vertically adjustable guide rollers extending from said frame for supporting the remaining unclamped portion of said second section of pipe.

6. Apparatus of claim 5 including rotatable wheels attached to said frame for rolling movement along the ground.

7. Apparatus of claim 6 wherein said wheels include a set of forward pivotal guide wheels, a handlebar attached to said guide wheels, means on said handlebar to raise said fused pipe out of said clamps so as to be supported on said guide rollers while moving said frame to the other nonfused end of said second pipe.

8. Apparatus for preparing and fusing first and second pipe ends together comprising in combination:
   a wheeled support frame;
   tandem fixed clamp means spaced rearwardly on said frame to retain the end of said first pipe in a fixed axial position;
   parallel guide rods attached to and extending forwardly of the forwardmost fixed clamp, said rods spaced on each side of said first pipe such that the axes thereof lie in an imaginary horizontal plane which intersects the axis of said first and second pipe, each rod including a fixed piston and hydraulic pressure fluid flow passages to each side of said piston;
   tandem clamp means to retain the end of said second pipe spaced from and opposite said first pipe end, said clamps retained together by parallel cylinders coaxially movable along said guide rods forming, relative to said piston, a first annular chamber and a second annular chamber, the ends of said cylinders being sealed about said rods;
   hydraulic pressure fluid supply means in communication with said flow passages to supply said fluid to said first annular chamber while exhausting fluid from said second chamber or vice-versa whereby said second pipe end is movable axially toward or away from said first pipe end; and
   a vertically adjustable guide roller on said frame to support the unclamped rearward portion of said first pipe and the unclamped forward portion of said second pipe.

9. Apparatus of claim 8 including:
   means to square face the ends of said first and second pipe ends simultaneously, said means slidably and removably supported on said guide rods.

10. Apparatus of claim 8 including:
    means to heat said first and second pipe ends simultaneously to a molten condition, said means slidably and removably supported upon said guide rods.

11. Apparatus of claim 3 wherein said frame is removably attached to said wheels.

References Cited
UNITED STATES PATENTS

| | | | |
|---|---|---|---|
| 3,552,265 | 1/1971 | Lucas | 156—258 |
| 3,013,925 | 12/1961 | Larsen | 156—258 |
| 3,400,030 | 9/1968 | Burger | 156—304 |
| 3,253,972 | 5/1966 | Huddleston | 156—304 |

ROBERT F. BURNETT, Primary Examiner

G. W. MOXON, II, Assistant Examiner

U.S. Cl. X.R.

156—153, 158, 258, 304, 372, 507, 508, 509, 535